Feb. 25, 1936.    G. GERALDSON    2,031,640
TRACTOR PLANTER
Filed Sept. 8, 1934    2 Sheets-Sheet 1
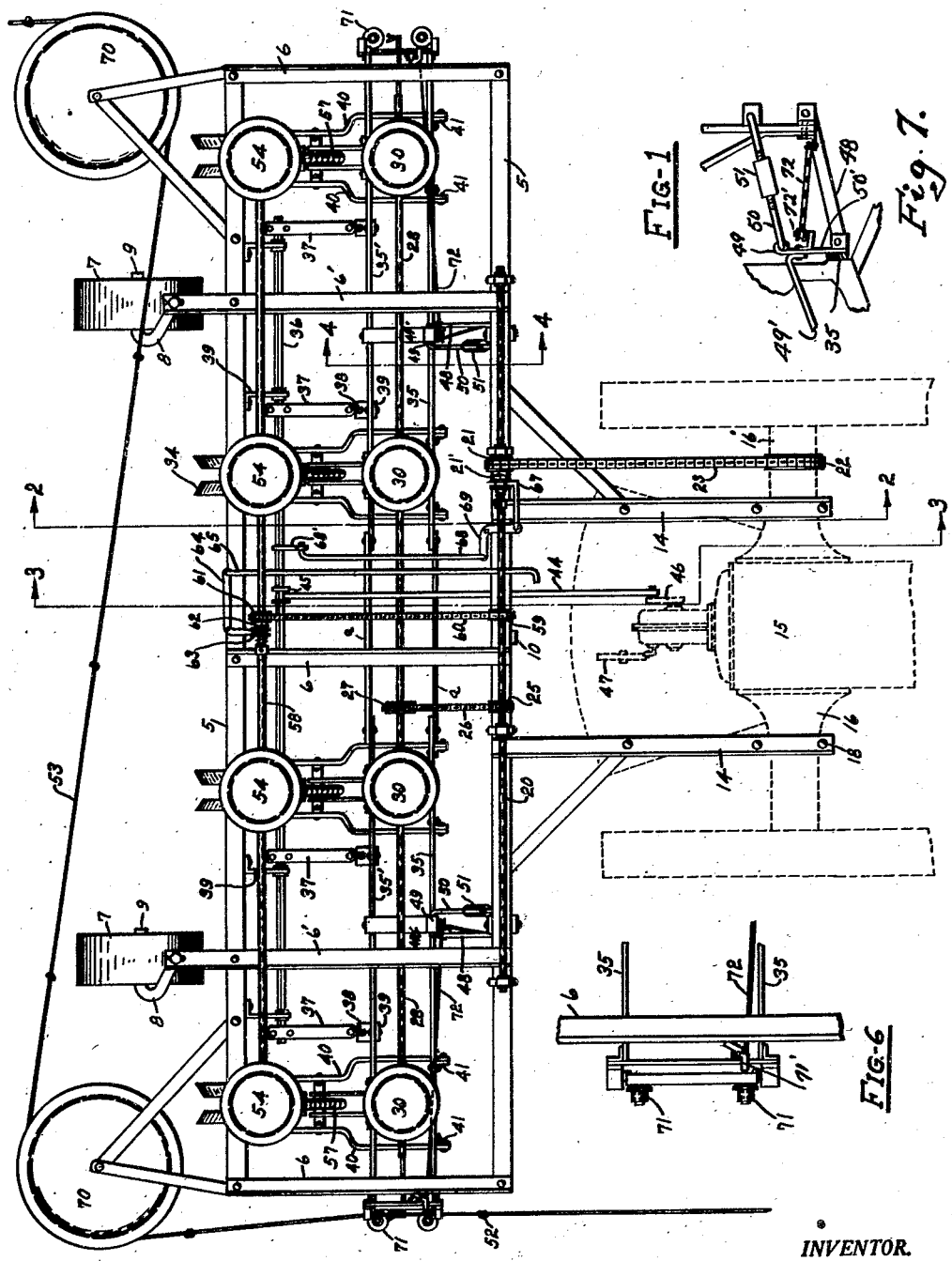
INVENTOR.
GERALD GERALDSON
BY James A. Walsh
ATTORNEY

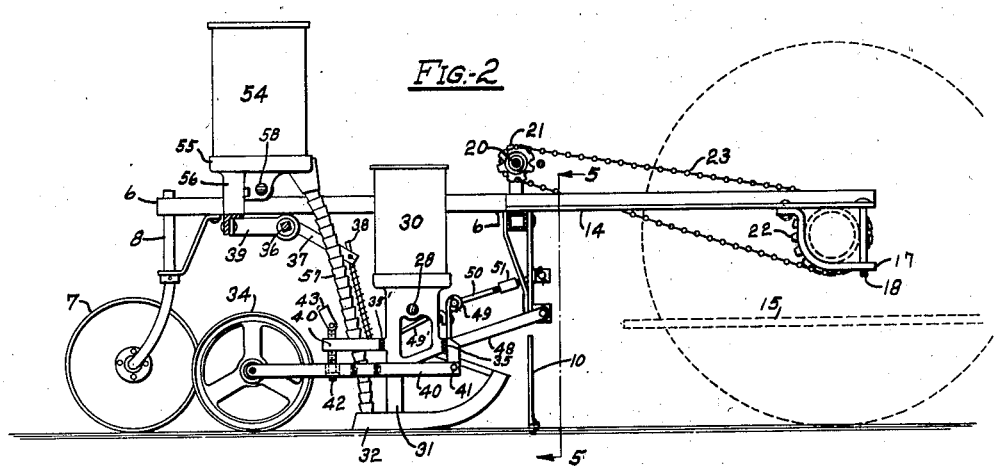

Patented Feb. 25, 1936

2,031,640

UNITED STATES PATENT OFFICE 2,031,640

TRACTOR PLANTER

Gerald Geraldson, Racine, Wis., assignor to J. I. Case Company, Racine, Wis., a corporation Application September 8, 1934, Serial No. 743,174

12 Claims. (Cl. 111—59)

My invention relates to improvements in check-row planters designed to be drawn and operated by a tractor, my object being to so mount the implement in relation to the tractor that it may be quickly connected to and detached therefrom, well balanced, and, when attached, will not impart undue strain upon the tractor to cause its front end to rise, which is a common objection to some types of tractor implements, and other improvements will be apparent from the following description.

In the accompanying drawings, forming part hereof, Figure 1 is a plan view of a four-row planter embodying my improvements and attached to a tractor, the latter being shown in fragment; Fig. 2, a transverse view partly in section taken on the dotted line 2—2 in Fig. 1; Figs. 3 and 4, detail sectional views taken on the dotted lines 3 -3 and 4—4, respectively in Fig. 1; Fig. 5 is a fragmentary front elevation taken on the dotted line 5—5 in Fig. 2 showing a folding support for the planter frame; Fig. 6 is a detail plan view showing the check-head in tipped position, and Fig. 7 is a detail of the check-head and its operating devices.

In said drawings, the numerals 5, 6, indicate the main frame of the planter, which is preferably of rectangular formation, and upon cross-members 6' of said frame caster wheels 7 are supported by a curved or other arm 8 terminating in an axle 9. Upon the front of the frame I provide a supporting leg 10, pivoted at 11, so that it may be folded when the planter is traveling, but which may be unfolded when the planter is detached from the tractor, and with the caster wheels, the implement will be well balanced in normal position. To said frame 5 I secure draft-bars 14 which extend forwardly astride the tractor body 15, and each is pivotally connected to an axle housing 16 by a keeper 17 and a removable pin 18, Fig. 3. The frame 5 supports an operating shaft 20 having a loosely running sprocket 21 thereon including a clutch member 21' connected to a sprocket 22 on the tractor axle 16' by an actuating chain 23. Shaft 20 also carries a sprocket 25 connected by a chain 26 to a sprocket 27 on a seeder shaft 28, as is common, which engages and actuates suitable well known mechanisms (not shown) associated with the seed cans 30 for dropping seeds therefrom through the outlets 31 and runners 32, Fig. 2, all in a well known manner.

The seed cans 30 and runners 32, together with presser wheels 34, and parts associated therewith, are supported by a supplemental frame comprising the members 35, 35', which frame is connected to a rock-shaft 36 by arms 37, each arm including a tension-rod 38, fastened to a frame part 35', said rock-shaft being secured to the main frame by brackets 39. The presser wheel 34 of each seeding equipment is assembled on the frame 40, which latter, at 41, is pivoted to a member on frame part 35, and the runner 32 and parts assembled therewith through the pivotal connection 41 may be adjusted vertically in relation to presser wheel 34 as required by the screw 42 passing through a member 40' and engaging frame member 40 and which screw is operated by the handle 43, Fig. 2, as is common. The rock-shaft 36 is operated by a rod 44 connected to said shaft by a crank 45, and which rod extends forwardly through the planter frame 5, 6, and is attached to a power-lift 46 on the tractor, which power-lift, in a well known manner, is actuated a half turn by depressing its treadle 47, which causes rod 44 to rock said shaft 36, and, through the arms 37 and tension-rods 38, the entire supplemental frame 35, with the seeding mechanisms mounted thereon is raised or lowered as desired in relation to the main frame 5, 6. The inner ends of the frame members 35 are connected by bars $a$ of a character which will slightly flex, so that an outer and an inner seed can and appurtenances supported by each pair of frame members 35 constitute a planter unit independently adjustable of the opposite similar unit because of the twisting connection of said members 35 by the bars $a$, and which two units may also be simultaneously adjusted, as stated. The supplemental frame is pivotally connected to the front end of the main frame by braces 48, and each planting unit may be tilted rearwardly or forwardly by lengthening or shortening the link 50, Fig. 4, by the turnbuckle 51, said links being in parallel relation to the braces 48 and connected to the front frame 5, and to the seed can frame, at 49, by a strap 50' which is secured to the brace 49', as indicated in Fig. 4, so that the outlet 31, through the buttons 52 of the check-wire 53, may be positioned in proper alignment with cross rows already planted and an accurate check thus assured, and when seed being dropped does not properly cross check then the outlet 31 may be adjusted in advance or rearwardly of the buttons, as required, and as indicated by full and dotted lines in Fig. 4.

In connection with the seed planters means for fertilizer distribution are also provided, comprising the cans 54, each having a base 55, secured to a bracket 56 mounted on the main frame 5, said cans including the usual agitating and distributing mechanisms (not shown) and conduits 57 leading to the runners 32 and discharging through the heels of the runners behind the seeder outlets 31, whereby fertilizer is supplied with the seed, and which deposits are covered by the trailing presser wheels 34. The actuating mechanisms of the fertilizer cans are connected to and operated by the shaft 58, which is rotated from the driven shaft 20 by a sprocket-and-chain system 59, 60, 61, the sprocket 61 being loosely mounted and including a clutch member 62 adapted to be engaged and declutched from a yieldingly mounted clutch member 63 by a bell-crank 64 actuated by a rod 65 extending within reach of the tractorman, who may readily control the discharge of fertilizer independently of the seeding mechanism, as desired. However, when the supplemental frame 35, 35', with its seeding units, is raised through action of the power-lift 46 both the seeding and fertilizing mechanisms cease operation through the instrumentality of an automatic clutch 67, which becomes declutched from sprocket clutch 21' by the action of the shaft 36, which latter, when rocked, actuates the link 68 attached thereto at 68' to operate a bell-crank 69 for disengaging said clutch members. It will be understood, of course, that when the frame 35, 35', is lowered the reverse rocking of shaft 36 by tripping power-lift 46 throws clutch members 67 and 21' into operative engagement.

The implement, as is common, operates in connection with a check-wire, as 53, staked at opposite ends in the field and guided by sheaves 70 on the planter, which wire passes through a check-head 71, of any preferred construction, and, when the supplemental frame is raised a pulling force is exerted, through cable 72, running over a guide 72' anchored to a part of frame upon check-head release 71' so that when the implement is being turned the check-head will be tipped or rocked in its bearing to doff the check wire 53 in a well known manner, and which wire is replaced on the planter after the same has been turned and the supplemenal frame in position to be drawn through another set of rows.

From the description it will be seen that I provide a combination tractor-planter in which the weight of the planter is mainly carried by the wheels 7 and its draft-bar connection with the tractor is so arranged that no appreciable strain will be effected on the latter as the machine travels over ground irregularities, and consequently raising of the forward end of the tractor is avoided, that by the simple manner of attaching the planter to the tractor said elements may be quickly detached, and that by supporting the front end of the planter by the leg 10 the tractor can be readily manoeuvered to be easily attached to the draft-bars 14. In providing the seeding equipment in a manner to be elevated, and, with the fertilizer equipment, rendered inoperative, Fig. 3, the planter is relieved of strain when drawn through the fields or otherwise, as the seeding mechanism is thus removed from the ground, and the planter as a whole carried by the wheels 7 and the tractor 15, and, when adjusted for operating, the fertilizer equipment can be readily controlled to distribute fertilizer simultaneously with the dropping of the seeds from the seed cans, or rendered inoperative, as desired; and, further, the seeding mechanism can be quickly adjusted in relation to the buttons or trips associated with the wire 53 as to deposit the seeds in or out of alignment with the trips as the seeding operation demands, each seeding unit being capable of true vertical adjustments through the action of the parallel connections 48 and 50 with the main frame.

I claim as my invention:

1. In an implement of the class described, a planter having a main frame, wheels on the rear end of the frame for movably supporting the latter, draft-bars connected to the front end of the frame, means on the forward ends of the draft-bars for detachably securing the same to a tractor, a supplemental frame pivotally connected to the main frame, seed dropping mechanisms mounted on the supplemental frame, a driven shaft on the main frame, means connecting the driven shaft and seed dropping mechanisms for actuating the latter, a rock-shaft on the main frame in parallel relation to said shaft, arms connecting the rock-shaft and supplemental frame, a sprocket-and-chain system connecting the tractor and driven shaft for rotating the latter, a clutch associated with the sprocket-and-chain system and the driven shaft, means connecting the clutch to the rock-shaft, and means connecting the rock-shaft to a power-lift on a tractor whereby when the power-lift is actuated said rock-shaft will be rotated to disengage said clutch and raise the supplemental frame and parts associated therewith from the ground.

2. In an implement of the class described, a planter having a main frame, wheels on the main frame for movably supporting the latter, means connecting the front end of the frame to a tractor whereby said planter is maintained in balanced position, a supplemental frame pivotally connected to the main frame, seed dropping mechanisms mounted on the supplemental frame, a driven shaft on the main frame, means connecting the driven shaft and seed dropping mechanisms for actuating the latter, a rock-shaft on the main frame, arms connecting the rock-shaft and supplemental frame, means connected to and driven by a tractor and connected to the driven shaft for rotating the latter, means connected to the rock-shaft for disengaging the tractor driven means from the driven shaft, and means connected to the rock-shaft and to a power-lift on a tractor for controlling said disengaging means whereby when the power-lift is actuated said rock-shaft will be rotated to disengage said tractor driven means and raise or lower the supplemental frame and parts associated therewith in relation to the ground.

3. In an implement of the class described, a planter having a main frame, means on the rear end of the frame for movably supporting the latter, means connecting the front end of the frame to a tractor for maintaining the planter in balanced position, a supplemental frame within and pivotally connected to the main frame, seed dropping mechanisms on the supplemental frame, means for actuating the seed dropping mechanisms, fertilizer distributing mechanisms mounted on the main frame, means for actuating the fertilizer distributing mechanisms, means connecting the tractor to the planter for actuating the seed dropping and the fertilizer distributing mechanisms, a rock-shaft on the main frame and connected to the supplemental frame, means connecting the rock-shaft to a power-lift on the tractor, means for actuating the power-lift to rotate said rock-shaft, and means for disengaging the actuating means connected to the tractor and the planter whereby the rock-shaft will vertically adjust the supplemental frame and prevent the distributing means from operating.

4. In an implement of the class described, a main frame, wheels at the rear end of the frame, means for connecting the front end of the frame to a tractor, a supplemental frame, seed dropping units mounted on the latter frame, parallel links connecting the main and supplemental frames, means for shortening and lengthening one of the links for adjusting a seed dropping unit to discharge in alignment with or forwardly or rearwardly in relation to a check-wire trip, fertilizer distributing mechanism on the main frame comprising a plurality of units, means for raising the supplemental frame from the ground, and means for rendering said seed dropping and fertilizer distributing units inoperable.

5. In an implement of the class described, a main frame, a supplemental frame pivotally connected to the main frame, seed dropping units mounted on the latter frame, a driven shaft on the main frame, means connecting a tractor and said driven shaft for driving the latter, a rock-shaft on the main frame, means connecting said driven shaft and seeding units for actuating the units, fertilizer distributing units mounted on the main frame, means connecting said driven shaft and fertilizer units for actuating the latter, manually controlled means for discontinuing operation of the fertilizer units, means associated with said driving means and the driven shaft for preventing rotation of said shaft, a rod connecting the rock-shaft and a power-lift on a tractor, and means for actuating the power-lift to operate said rod to rotate the rock-shaft and vertically adjust the supplemental frame and also to actuate the means for preventing the driven shaft from rotating.

6. In an implement of the class described, a main frame having wheels at its rear end, draft means for detachably connecting the frame to a tractor, a driven shaft on the frame, means connection a tractor and said driven shaft for actuating the latter, a supplemental frame carrying seeding units, parallel linkage connecting the main and supplemental frames, a rock-shaft on the main frame, means connecting the rock-shaft and supplemental frame, and means connecting the rock-shaft to actuating means on a tractor whereby said rock-shaft is rotated to vertically adjust the supplemental frame and parts associated therewith through said linkage and rock-shaft connections with the supplemental frame.

7. In an implement of the class described, a main frame having wheels, means for detachably securing the frame to a tractor, a driven shaft on the frame, a supplemental frame pivotally connected to the main frame and having seed dropping units associated therewith, a shaft for operating said units, means connecting the driven shaft to said operating shaft for actuating the seed dropping mechanisms of said units, fertilizer distributing units on the main frame, a shaft for operating the latter units, means connecting the driven shaft to the last mentioned operating shaft for actuating said fertilizer distributor mechanisms, and means connecting a tractor to the driven shaft for actuating said operating shafts.

8. In an implement of the class described, a main frame having wheels, means for detachably securing the frame to a tractor, a driven shaft on the frame, a supplemental frame pivotally connected to the main frame and having seed dropping mechanisms associated therewith, a shaft for operating said mechanisms, means connecting the driven shaft to the operating shaft for actuating the seed dropping mechanisms, means connecting a tractor to the driven shaft for actuating said operating shaft, guides on the main frame, a check-head on the supplemental frame, a check-wire supported by the guides and check-head, and means for swinging the check-head to doff the check-wire therefrom and from the guides.

9. In an implement of the class described, a main frame having wheels at its rear end, draft members connecting the front end of the frame to a tractor, a supplemental frame, seed dropping mechanisms on the latter frame, means connecting a tractor to the seed dropping mechanisms for actuating the latter, parallel links connecting the main and supplemental frames, a rock-shaft on the main frame and connected to the supplemental frame, and means associated with the rock-shaft and a power-lift on a tractor for raising and lowering the supplemental frame.

10. In an implement of the class described, a main frame, wheels at the rear end of the frame, means for connecting the front end of the frame to a tractor, a supplemental frame, seed dropping units mounted on the latter frame, parallel links connecting the main and supplemental frames, means for varying the length of one of the links for adjusting a seed dropping unit to discharge in or out of alignment in relation to a check-wire trip, means for raising said supplemental frame from the ground, and means for rendering the seed dropping units inoperable.

11. In an implement of the class described including a main frame, means for securing the frame to a tractor, a driven shaft on the frame, a supplemental frame pivotally connected to the main frame and having seed dropping mechanisms associated therewith, a shaft for operating said mechanisms, means connecting the driven shaft to the operating shaft for actuating the seed dropping mechanisms, means on a tractor connected to the driven shaft for actuating said operating shaft, means connecting the supplemental frame to a power-lift on a tractor for raising and lowering the latter frame, guides on the main frame for supporting a check-wire, a check-head on the supplemental frame for supporting a check-wire, and a cable connecting the main frame and check-head for swinging the latter to doff a check-wire therefrom when the supplemental frame is raised.

12. In an implement of the class described, a main frame, draft members connecting said frame to a tractor, a supplemental frame comprising sections supported by the main frame, means connecting the sections whereby one of the sections may be adjusted forwardly and rearwardly in relation to the other, a plurality of seed dropping mechanisms on each of said sections, means connecting the tractor to the seed dropping mechanisms for actuating the latter, links connecting the main and supplemental frames, a rock-shaft on the main frame and connected to the supplemental frame, and a power lift on the tractor connected to the rock-shaft for raising and lowering the supplemental frame.

GERALD GERALDSON.